(12) United States Patent
Oh et al.

(10) Patent No.: US 8,073,437 B2
(45) Date of Patent: Dec. 6, 2011

(54) MOBILE COMMUNICATION TERMINAL FOR PROVIDING CONTENTS AND METHOD THEREOF

(75) Inventors: Dong-Hyuck Oh, Incheon (KR); Je-Hyun Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 590 days.

(21) Appl. No.: 11/583,701

(22) Filed: Oct. 20, 2006

(65) Prior Publication Data
US 2007/0093241 A1 Apr. 26, 2007

(51) Int. Cl.
*H04M 3/00* (2006.01)
(52) U.S. Cl. ..................... 455/418; 455/556.2
(58) Field of Classification Search .................. 455/464, 455/461, 466, 556.2, 403; 370/428, 348, 370/229, 477, 394, 338, 487; 84/609; 399/8; 715/856, 500, 501; 725/135, 2; 709/219, 709/225
See application file for complete search history.

(56) References Cited

U.S. PATENT DOCUMENTS

| | | | | | |
|---|---|---|---|---|---|
| 4,437,093 | A | * | 3/1984 | Bradley | 715/784 |
| 5,471,205 | A | * | 11/1995 | Izawa | 340/995.27 |
| 6,389,337 | B1 | * | 5/2002 | Kolls | 701/29 |
| 6,708,232 | B2 | * | 3/2004 | Obara | 710/11 |
| 6,795,827 | B1 | * | 9/2004 | Ohira | 707/101 |
| 6,952,221 | B1 | * | 10/2005 | Holtz et al. | 715/723 |
| 7,199,801 | B2 | * | 4/2007 | Tsunashima et al. | 345/552 |
| 2002/0024952 | A1 | * | 2/2002 | Negishi et al. | 370/394 |
| 2002/0046261 | A1 | * | 4/2002 | Iwata et al. | 709/219 |
| 2002/0112597 | A1 | * | 8/2002 | Shibata et al. | 84/609 |
| 2003/0074405 | A1 | * | 4/2003 | Nomura et al. | 709/204 |
| 2003/0078077 | A1 | * | 4/2003 | Kokubo | 455/566 |
| 2003/0097659 | A1 | * | 5/2003 | Goldman | 725/89 |
| 2004/0003028 | A1 | * | 1/2004 | Emmett et al. | 709/203 |
| 2004/0032400 | A1 | * | 2/2004 | Freeman et al. | 345/173 |
| 2004/0038690 | A1 | * | 2/2004 | Lee et al. | 455/466 |
| 2004/0190057 | A1 | * | 9/2004 | Takahashi et al. | 358/1.15 |
| 2004/0198431 | A1 | * | 10/2004 | Yamagishi et al. | 455/556.1 |
| 2004/0243942 | A1 | * | 12/2004 | Cortright | 715/769 |
| 2004/0248588 | A1 | * | 12/2004 | Pell et al. | 455/456.1 |
| 2005/0081252 | A1 | * | 4/2005 | Chefalas et al. | 725/135 |
| 2005/0281237 | A1 | * | 12/2005 | Heinonen et al. | 370/338 |
| 2006/0066754 | A1 | * | 3/2006 | Zaima | 348/564 |
| 2006/0271618 | A1 | * | 11/2006 | Kokubo et al. | 709/202 |
| 2006/0288091 | A1 | * | 12/2006 | Oh et al. | 709/219 |
| 2007/0142024 | A1 | * | 6/2007 | Clayton et al. | 455/403 |
| 2010/0287479 | A1 | | 11/2010 | Pell et al. | |

FOREIGN PATENT DOCUMENTS

| | | | |
|---|---|---|---|
| CN | 1574873 A | | 2/2005 |
| EP | 1 486 889 A1 | | 12/2004 |
| JP | 2005049759 A | * | 7/2003 |
| KR | 1999-0078840 A | | 11/1999 |
| KR | 10-0517980 B1 | | 9/2005 |
| WO | WO-01/86456 A1 | | 11/2001 |
| WO | WO 2004093044 A1 | * | 10/2004 |

* cited by examiner

*Primary Examiner* — Nick Corsaro
*Assistant Examiner* — Mahendra Patel
(74) *Attorney, Agent, or Firm* — Birch, Stewart, Kolasch & Birch, LLP

(57) ABSTRACT

A mobile communication terminal for providing contents to a user, comprises a transceiver for receiving one or more contents set as default and one or more new contents from a server; a display unit for displaying the contents set as default and the new contents; a controller for controlling the transceiver and the display unit, thereby to display the received contents set as default, and then display the new contents if the new contents is received.

9 Claims, 6 Drawing Sheets

MOBILE COMMUNICATION TERMINAL FOR PROVIDING CONTENTS AND METHOD THEREOF

BACKGROUND OF THE INVENTION

1. Field of the Invention

The present invention relates to a mobile communication terminal and, more particularly, to a mobile communication terminal capable of effectively providing contents to a user, and a method thereof.

2. Description of the Related Art

In general, a mobile communication terminal is a device allowing a user to wirelessly page another party and be wirelessly connected for performing communications any time and anywhere through controlling of switching by a mobile switching center (MSC) while traveling in a service area managed by a base station (BS). The mobile communication terminal can support multimedia communications including images and videos, as well as data communications including symbols, numbers and characters.

The mobile communication terminal provides (1) online services such as online games, mobile internet services, a VOD (Video On Demand) function and a file download function, (2) various message functions such as chatting, instant messaging, text messaging, multimedia messaging and e-mail, (3) a call function such as a voice call and a video call, (4) camera functions such as video capturing and still image capturing, and (5) various supplementary functions such as a scheduler, phone book searching, a calculator, a memo pad, communication content recording, terminal state setting, calendar searching, world time checking, time alarm setting, and video or music file reproducing.

Mobile communication terminals help to enhance quality of cultural life of users by providing online services allowing users to download music files, movie files and game files, especially among the diverse supplementary functions. As many online services are being provided as paid services, service providers are actively developing techniques for providing online contents in various forms.

However, the related art mobile communication terminal cannot suitably provide online services in the following aspects. That is, in order to receive desired online contents, the user must access a Web site that provides the online contents whenever the user wants such contents, check the matters contained in the online contents one-by-one, and execute the online contents. However, these cumbersome procedures are not effective in terms of time and cost.

BRIEF DESCRIPTION OF THE INVENTION

One aspect of the present invention involves the recognition by the present inventors of the drawbacks in the related art, as explained above. Based upon such recognition, improvements in mobile communication terminals and contents provision system can be achieved according to the present invention.

Certain features that may be part of the contents provision system and method thereof will not be described in much detail, merely to prevent the characteristics of the present invention from being obscured. However, such additional features may also be part of the contents provision system and method of the present invention, as would be understood by those skilled in the art.

An exemplary feature of the present invention is to provide a mobile communication terminal and method for effectively providing contents to a user by displaying contents set as default and one or more new contents on a certain area (e.g., a pre-set region) of the display screen according to pre-set options.

To implement at least the above feature in whole or in parts, the present invention provides a mobile communication terminal for providing contents to a user, comprising: a transceiver for periodically receiving one or more contents set as default and one or more new contents from a server; a display unit for displaying the contents set as default and the new contents; a controller for controlling the transceiver and the display unit, thereby to display the received contents set as default, and then display the new contents if the new contents are received.

To implement at least the above feature in whole or in parts, the present invention also provides a contents provision system, comprising: a mobile communication terminal for displaying one or more contents set as default and one or more new contents if the new contents have been received; and a server for providing one or more of the default contents and the new contents to the terminal.

To implement at least the above feature in whole or in parts, the present invention also provides a method for providing contents to a user, comprising: displaying at least one or more contents set as default; stopping or delaying the previously displaying of the contents, if new content is received; and, displaying the new content.

To implement at least the above feature in whole or in parts, the present invention also provides a method for providing contents to a user, comprising: displaying contents set as default downloaded from a server; checking whether at least one or more new contents have been received; if the new contents have been received, analyzing a pre-set option included in the received new contents; and sequentially displaying the new contents based on the analysis result.

To implement at least the above feature in whole or in parts, the present invention also provides a mobile communication apparatus, comprising: a screen to display information; a transceiver to receive multimedia announcements via a communications network; a memory to store the multimedia announcements received by the transceiver; and a processor, cooperating with the screen, the transceiver, and the memory to perform the steps of, checking one or more display characteristics of the received multimedia announcements, determining a sequential order of displaying the multimedia announcements on the screen based on the checked display characteristics, and displaying the multimedia announcements at dynamic or static positions on the screen according to the determined sequential order.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

A mobile communication terminal for effectively providing a plurality of contents by sequentially displaying contents set as default and one or more new contents on a pre-set region of a display unit according to pre-set options, and its method, in accordance with some exemplary embodiments of the present invention will now be described with reference to the accompanying drawings.

Hereafter, the term "mobile communication terminal" is intended to refer to and cover various types of communication devices (i.e., mobile stations (MS), user equipment (UE), handsets, PDAs, etc.) that support mobility (or may be fixed) and allows communication of information via wired and/or wireless interfaces. The mobile communication terminal may have different configurations, such as a bar type, a folder type, a slider type, and the like.

In the present invention, the mobile communication terminal may use an update function which is a supplementary function for providing contents that can be previously set. Namely, the update function refers to a function of periodically downloading a plurality of contents displayed on the mobile communication terminal and automatically updating them.

Figure 1:
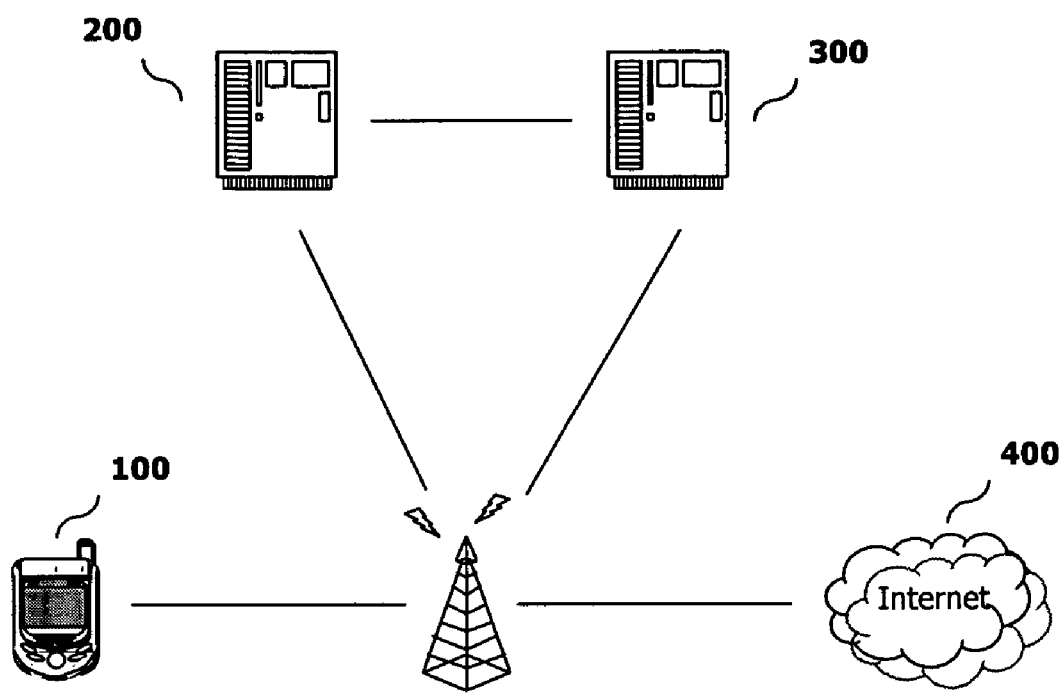
FIG. 1 shows an exemplary contents provision system in accordance with the present invention.

FIG. 1 shows a contents provision system in accordance with the present invention.

As shown in FIG. 1, the contents provision system may include: a first server 200 for registering at least one or more mobile communication terminals using an update function; a mobile communication terminal 100 for being registered in the first server 200 and sequentially displaying contents set as default and new contents on a pre-set region of a display unit according to pre-set options; and a second server 300 for providing at least one or more of the default contents and the new contents and selectively providing pre-set options with respect to the default contents and the new contents. Herein, these contents may be intended for user to be provided with personalized contents, or intended for someone to provide commercials or advertisements.

The pre-set options may include an ID, a sequence number, a start time and end time, which may be preferably set by the second server 300.

An exemplary construction of the mobile communication terminal for providing contents to the user will be described with reference to FIG. 2.

Figure 2:
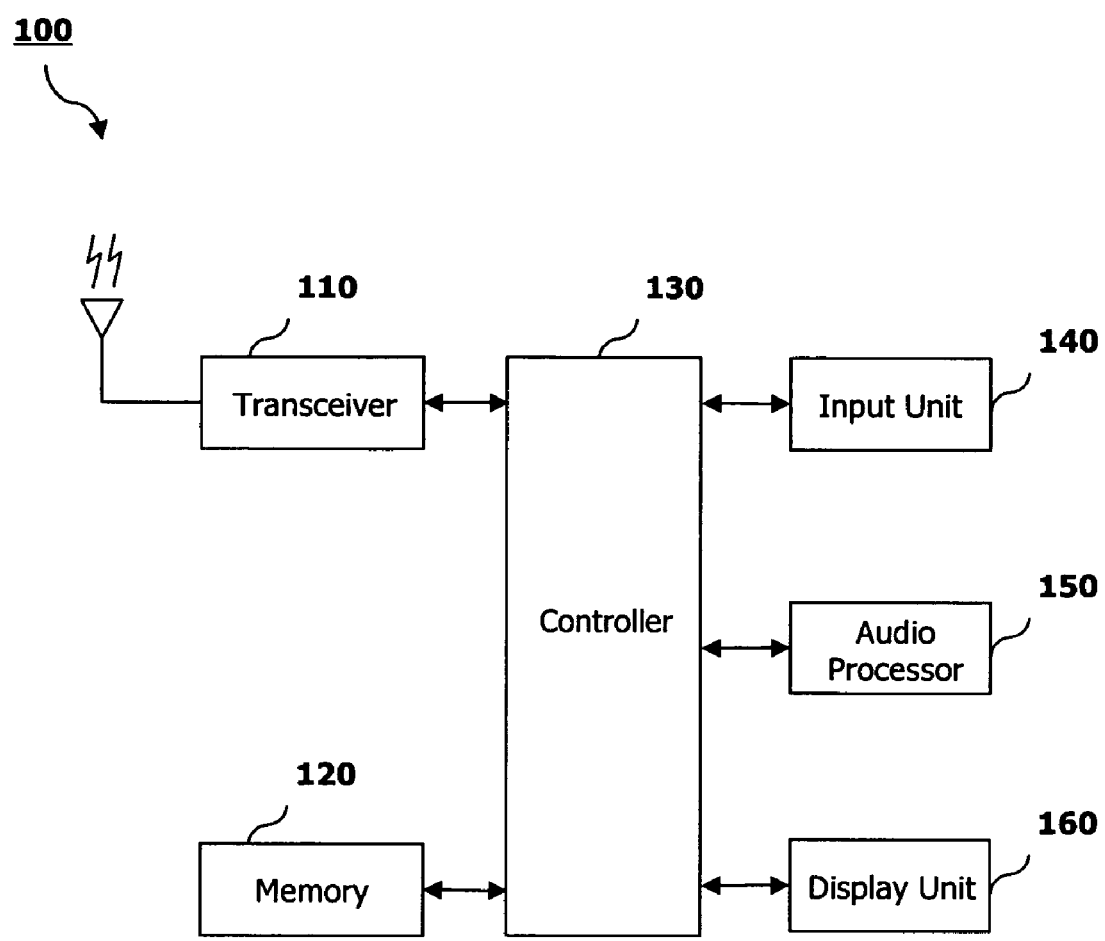
FIG. 2 is a block diagram showing an exemplary construction of a mobile communication terminal for providing contents to a user in accordance with the present invention.

FIG. 2 is a block diagram showing the construction of an exemplary mobile communication terminal for providing contents in accordance with the present invention.

As shown in FIG. 2, a mobile communication terminal for providing contents in accordance with the present invention may include: a transceiver 110 for periodically receiving contents set as default and new contents (e.g. advertisement); a memory (i.e., RAMs, ROMs, hard disk type memories, Flash memories, etc.) 120 for storing the default contents and the new contents; a controller 130 for controlling the transceiver 110 and a display unit 160, thereby to display the contents set as default, and then to display the new contents if the new contents is received, and analyzing pre-set options included in the contents thereby to display the default contents and the new contents according to the analysis result; and the display unit (e.g., LCD, PDP, etc.) 160 for sequentially displaying the default contents and the new contents on a pre-set region based on the analysis result.

An exemplary method for providing contents constructed as described above will now be explained with reference to FIG. 3.

Figure 3:
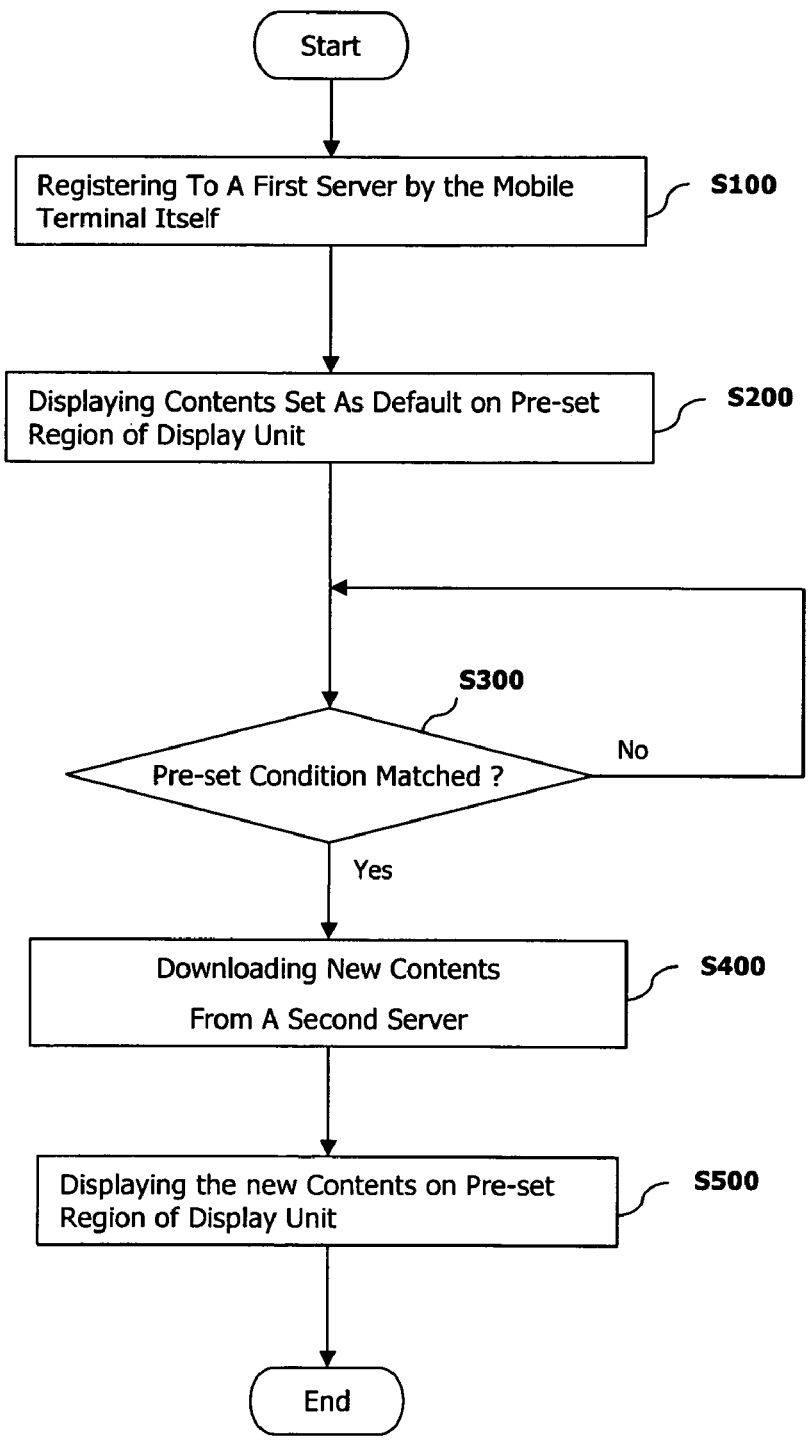
FIG. 3 is a flow chart illustrating the processes of an exemplary method for providing contents to a user in accordance with one embodiment of the present invention.

FIG. 3 is a flow chart illustrating the processes of an exemplary method for providing contents to the user in accordance with one embodiment of the present invention.

As shown in FIG. 3, the method for providing contents may include: registering a mobile communication terminal that uses an update function to a first server by the mobile communication terminal itself (step S100); sequentially displaying by the mobile communication terminal contents set as default on a pre-set region of a display unit (step S200); checking by the mobile communication terminal whether a pre-set condition is matched (step S300); downloading by the mobile communication terminal new contents from a second server when the pre set condition matches (step S400); and sequentially displaying by the mobile communication terminal the downloaded new contents on a pre-set region of the display unit according to pre-set options (step S500).

The method for providing contents in accordance with the present invention will be described in more detail as follows.

First, when an update function can be used, the controller 130 of the mobile communication terminal registers the mobile communication terminal to the first server 200 (step S100). Namely, the first server 200 can receive registration of at least one or more mobile communication terminals that use the update function and manage them. Here, the controller 130 can set or release the update function according to a user selection over an option for setting the automatic update function.

The controller 130 sequentially displays contents set as default on a pre-set region of the display unit 160 (e.g., displayed on a certain portion of the display screen, such as, at a corner portion, a random screen area, along an edge of the screen, etc.) (step S200). Preferably, the contents set as default changes according to a user selection.

Thereafter, the controller 130 checks whether the pre-set condition is matched (e.g., a pre-set time, a pre-set geographical position)(step S300). Here, the pre-set condition may be changed or modified automatically or manually. Namely, if the user has a special interest on a certain content, which may be automatically detected based on pre-stored a user preference setting (i.e., the user's age, hobby, gender, etc.) or may be manually achieved through an input unit (e.g., keypad, function buttons, touch-sensitive input device, etc. to allow audible, visual, and/or tactile inputs) mounted in the mobile communication terminal.

And then, the controller 130 can download the new contents from the second server (step S400).

And then, the controller 130 can sequentially display the downloaded new contents on the pre-set region of the display unit 160 (step S500).

The display unit of the mobile communication terminal, on which the contents are displayed, will now be described with reference to FIG. 4.

Figure 4:
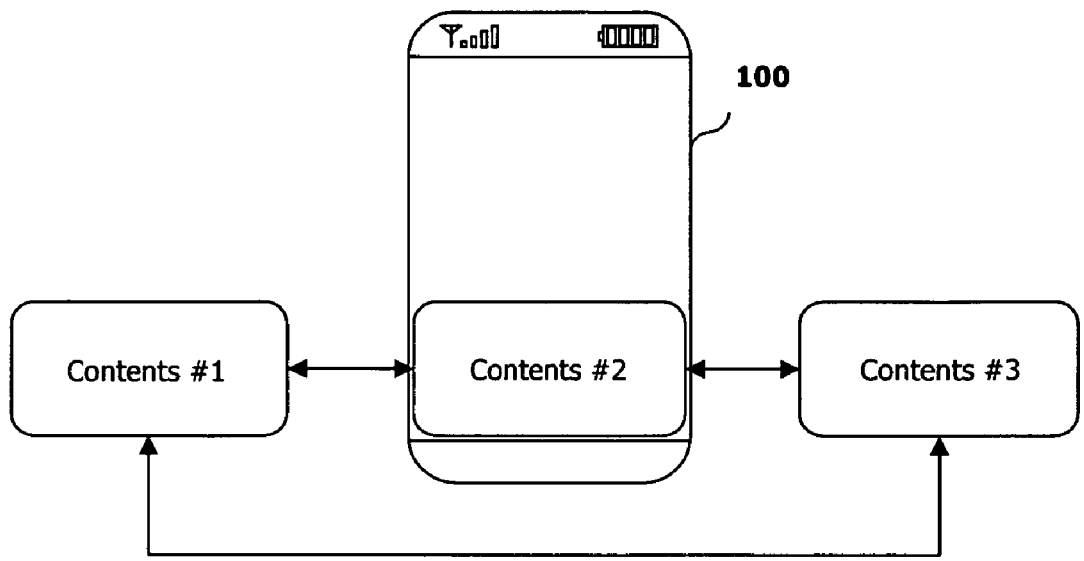
FIG. 4 is an exemplary view showing an exemplary display unit of the mobile communication terminal in accordance with the present invention.

FIG. 4 is a view showing an exemplary display unit of the mobile communication terminal in accordance with the present invention.

As shown in FIG. 4, the mobile communication terminal may sequentially display the contents on a pre-set region of the display unit. The displayed contents can be shifted (i.e., changed, moved, repositioned, etc.) in a periodic manner (i.e., at pre-set time intervals, such as every 5 seconds) or according to user selection.

The mobile communication terminal can sequentially display the contents at a pre-set region, namely, at various positions (i.e., at least one of up, down, left and right regions) of the display unit, but also, can selectively shift (i.e., change, move, reposition, etc.) the contents in one of up, down, left and right directions.

Such displaying of contents in the form of a pop-up screen, pop-up image or the like on the screen in a consecutive (sequential) manner would likely cause the user to take notice of the announcements (i.e., commercial ads or information notices). Eye-catching graphics, animation effects, and the like may be used to promote user viewing. The particular location where the contents is to be continuously (sequentially) displayed may be dynamic or static.

For dynamic display, the screen locations may be calculated by an algorithm that provides a fixed offset distance and direction on the screen, such that the contents are shown intermittently at certain locations on the screen. Alternatively, the screen location may be randomly selected by an algorithm such that consecutive contents or ad images are shown randomly around the screen. Such dynamic display may increase the chances that the user will visually notice the contents shown in the screen, For static display, the contents may always be shown at a certain fixed locations of the screen (e.g., a top edge, bottom edge, corner, etc.). For example, contents may be shown on at least one of the upper left-hand corner of the screen. This may be preferable due to the size or shape of the advertisement.

Figure 5:
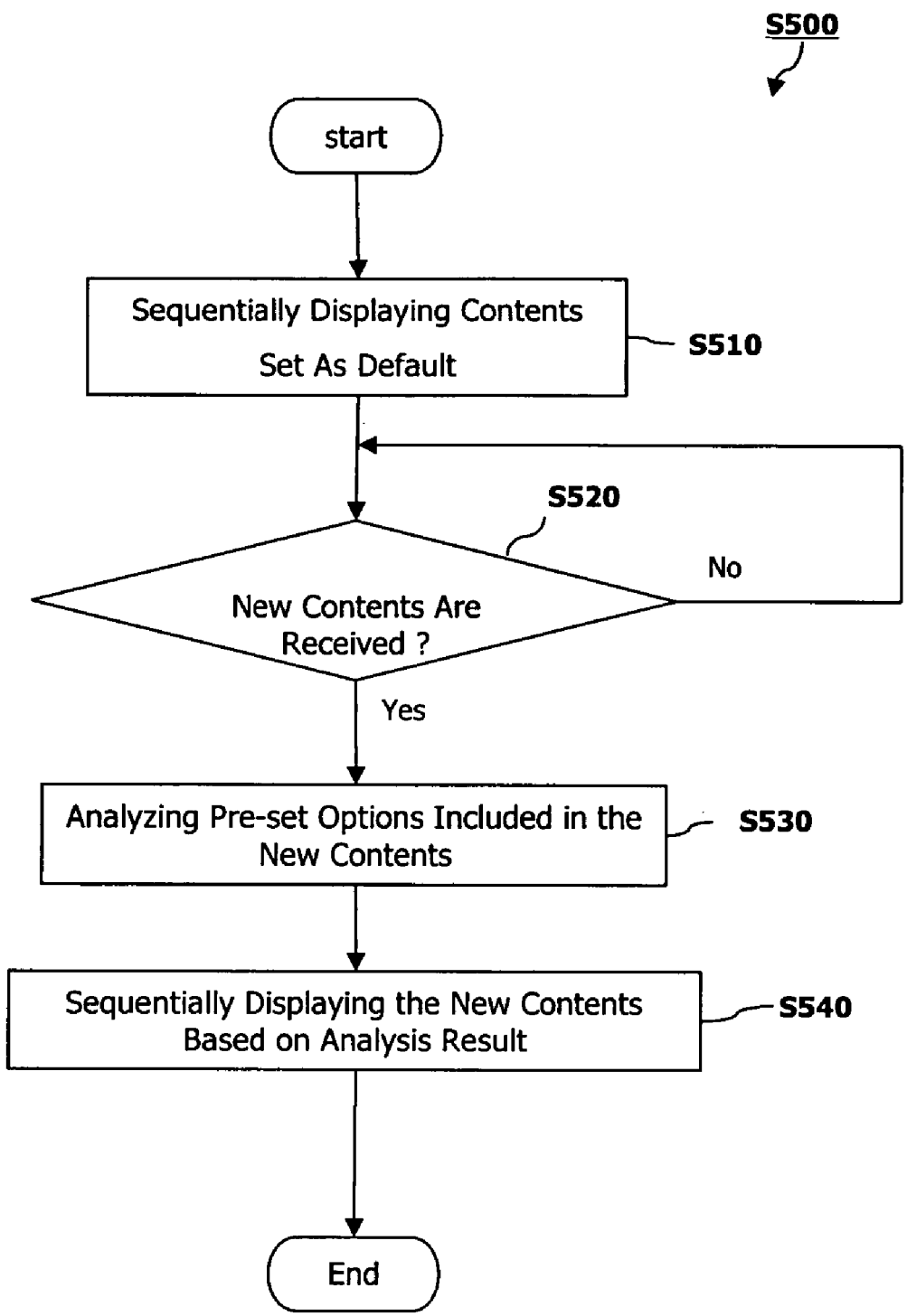
FIG. 5 is a flow chart illustrating the processes of an exemplary method for providing contents to a user in accordance with other embodiment of the present invention 4.

FIG. 5 is a flow chart illustrating the processes of an exemplary method for providing contents to the user in accordance with other embodiment of the present invention.

As shown in FIG. 5, the method for providing contents to the user at a mobile communication terminal in accordance with the present invention may include: sequentially displaying contents set as default (step S510); checking whether at least one or more new contents has been received (step S520); when the new contents have been received, analyzing pre-set options included in the received new contents (step S530); and sequentially displaying the new contents based on the analysis result (step S540).

The method for providing the contents to a user at the mobile communication terminal in accordance with the present invention will now be described in more detail.

First, the controller 130 may sequentially display the contents set as default on a pre-set region of the display unit 160 according to the pre-set options, e.g., the ID and the sequence number (step S510).

In this case, the controller 130 may check whether at least one or more new contents have been received (step S520). Namely, the controller 130 can periodically check whether emergency information or important information, besides the periodically received contents, has been received frequently.

When the new contents have been received, the controller 130 analyzes the pre-set options, e.g., the ID, the sequence number, the start time, the end time, etc. (step S530).

The controller 130 may display the new contents based on the analysis result (step S540). The principle for displaying the new contents will be described as follows with reference to FIG. 6.

Figure 6:
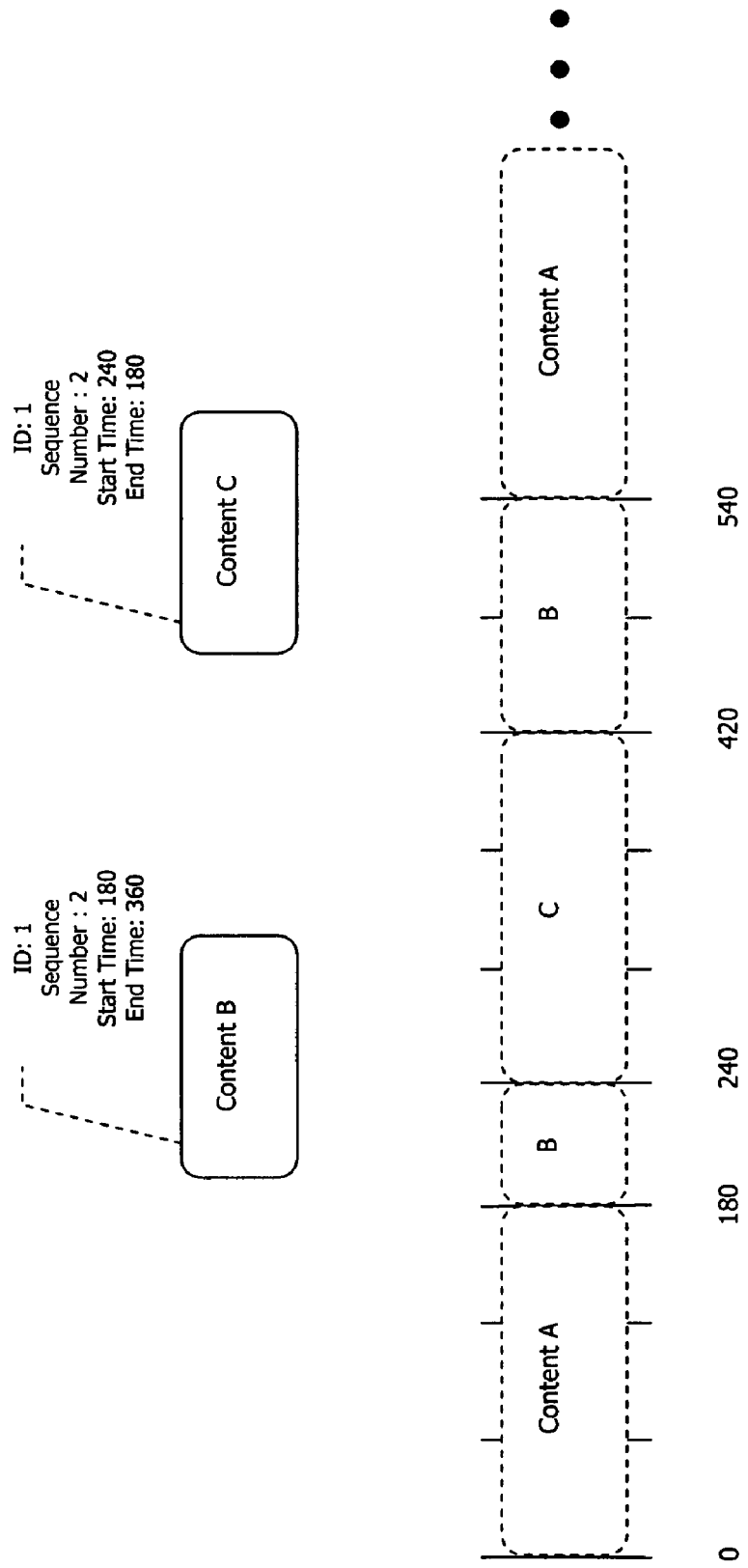
FIG. 6 is an exemplary view for explaining an exemplary principle of playing contents in accordance with the present invention.

FIG. 6 is a view for explaining a principle of displaying contents in accordance with the present invention.

As shown in FIG. 6, the mobile communication terminal can sequentially display the contents set as default and the new contents based on the options, namely, the ID, the sequence number, the start time and the end time, which have been previously set with respect to the contents. In detail, despite of the displaying of the new contents, the displaying of the contents set as default may not be stopped but delayed according to the options.

The method for displaying the contents at the mobile communication terminal will be described in more detail as follows.

For example, when default contents (e.g. online contents such as commercials, or advertisement) are sequentially displayed, the mobile communication terminal 100 can receive new contents. Namely, the second server 300 can periodically provide the default contents to the mobile communication terminal, and also provide the new contents such as emergency information (e.g., natural disaster warnings) or other types of important information (e.g., information on a brand new car) according to the user's interest any time as necessary.

When the mobile communication terminal 100 receives 'B' and 'C' corresponding to first and second new contents during displaying default content 'A', it can analyze the new contents and recognize that the 'B' of the first content has an ID of 1, the sequence number of 2, the start time of 180 seconds, the end time of 360 seconds, and the 'C' of the second content has an ID of 1, the sequence number of 2, the start time of 240 seconds, the end time of 180 seconds. Here, the end time of certain preferred contents may have a relatively longer time value compared with other non-preferred contents.

Accordingly, the mobile communication terminal 100 can display the 'B' of the first content in place of the default content 'A'. In detail, the mobile communication terminal can start displaying of the 'B' of the first content when 180 seconds has lapsed since the 'A' of the default content started to be displayed, and terminates displaying of the 'B' of the first content in 360 seconds, so that the mobile communication terminal can display the 'B' of the first content for 180 seconds.

In addition, the mobile communication terminal 100 can display the 'C' of the second content in place of the 'A' of the default content. In detail, the mobile communication terminal can start displaying of the 'C' of the second content when 240 seconds has lapsed since the 'A' of the default content started to be displayed, and terminates displaying of the 'C' of the second content in 180 seconds, so that the mobile communication terminal can display the 'C' of the second content for 180 seconds.

In this case, the B and C of the first and second contents may be overlapped during the time interval of 240 seconds to 420 seconds, so the mobile communication terminal 100 displays the 'B' of the first content from 180 seconds to 240 seconds and the 'C' of the second content from 240 seconds to 420 seconds, and then the 'B' of the first content from 420 seconds to 540 seconds.

As a result, the mobile communication terminal 100 can display the 'B' of the first content for 60 seconds among 180 seconds and the 'C' of the second content for 180 seconds based on the pre-set options, and then the 'B' of the first content for 120 seconds among 180 seconds. And, if the end time of the default content 'A' is set to be relatively long, the mobile communication terminal can display the 'B' and 'C' of the first and second contents, and then display the default content 'A'.

In order to provide contents selected by the user from the displayed contents, the mobile communication terminal can be connected with a corresponding Web site and execute corresponding contents.

For example, when contents for receiving new music video is selected by the user, the mobile communication terminal 100 can be connected with a Web site corresponding to the selected contents, so that the user can enjoy the new music video in real-time through the connected Web site.

As so far described, the mobile communication terminal for providing contents and its method in accordance with the present invention can effectively display a plurality of contents including at least one or more new contents by sequentially displaying contents set as default and one or more new contents on a pre-set region of the display unit according to pre-set options.

In the above exemplary description, it has been described that the first sever serves as register server, and the second server serves as provision server, but the first server and the second server be may incorporated into only one server, then the only one server serves as both register and provision server.

Also, the method shown in the FIG. 3 and method shown in the FIG. 5 could be merged.

In the above exemplary description regarding the present invention features, it can be understood that communication devices (terminals, handsets, PDAs, notebook computers, etc.) playing contents are being implemented with various image processing functions in order to enhance the multimedia experience for the user. To do so, many technical aspects need to be considered.

Due to the particular characteristics of a mobile communication terminal, various aspects, such as mobility, limited processor capabilities, restricted memory size, restrictions on battery power consumption, a relatively small-sized display screen, etc., need to be considered when implementing the present invention. For example, a small portion of the screen (or pop-up window) may be used for visually displaying the plurality of contents, while most of the screen is used to display the broadcast streaming service. However, due to the relatively small size of the display screen or limited processor capabilities, or limited battery power, it may only be possible to display limited number of the plurality of contents. Also, the memory or other type of storage means may have a limited capacity, so thus it can be understood that the number of contents being stored may need to be restricted. For instance, the memory or storage for the mobile communication terminal may be capable of storing about 15 minutes' worth of the contents. Thus, if the user keeps using of the mobile communication terminal for more than 15 minutes (or whatever the buffer or memory capacity is), then the "older" contents may need to be deleted, so that "newer" contents can be stored. Such deletion may be performed automatically without any user intervention, or the user may be asked whether the deletion of "older" data would be acceptable. Also, instead of storing a complete full version of the contents during the usage of the mobile communication terminal, such contents may be stored in a compressed or abbreviated manner. For example, some of contents such as commercials or advertisements in the streaming broadcast service data may be detected and not recorded (stored) in memory in order to save memory capacity. Here, it can be understood that contents such as commercials and advertisements may initially be stored, but upon detection that the memory capacity is almost full, any recorded contents may then be deleted. Alternatively, the image resolution or data file size of the contents may be reduced (compressed) for storage so that more content can be stored into the memory. Although the image resolution of the contents may be degraded somewhat, the user may nonetheless be satisfied that he may still observe some of the contents that he or she has a most interest.

The present invention is described as being implemented in a general mobile communications system. However, the features of the present invention may also be adapted and implemented in communications systems operating under other types of communication specifications (e.g., 3GPP2, 4G, IEEE, OMA, etc.), because the concepts and teachings of the present invention could be applied to various communication schemes that operate in a similar manner based upon common techniques. Furthermore, the present invention not only results in supporting advertisement information in general calling process, but also, can be applied in any other current technology. Namely, digital broadcasting technologies (e.g., satellite or terrestrial digital multimedia broadcasting (DMB), digital video broadcasting for handheld (DVB-H), etc.), downloading streaming videos from Internet servers, performing multimedia communications via wireless interfaces (Wi-Fi, Wi-MAX, etc.) and the like, are some non-limiting examples of practical applications that would benefit from the teachings and suggestions of the present invention.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

Furthermore, the mobile communication terminal may be configured to comprise a storage media receiving port that allows an external storage medium (such as a memory card) to be inserted thereto for storing data therein. Also, additional (optional) function units (such as a broadcast reception module, MP3 module, Internet banking module, etc.) may be provided.

Additionally, even though it would be too numerous to list all the features and variations that can be implemented in mobile communication terminals to accommodate and support the recent trend towards convergence of electronic and/or digital devices, those skilled in the art would easily understand that elements (i.e., hardware, software, or a combination thereof) that are equivalent to the function units and/or modules described above may be implemented in the mobile communication terminal in accordance with the present invention.

The present invention provides a mobile communication apparatus, comprising: a screen to display information; a transceiver to receive multimedia announcements via a communications network; a memory to store the multimedia announcements received by the transceiver; and a processor, cooperating with the screen, the transceiver, and the memory to perform the steps of, checking one or more display characteristics of the received multimedia announcements, determining a sequential order of displaying the multimedia announcements on the screen based on the checked display characteristics, and displaying the multimedia announcements at dynamic or static positions on the screen according to the determined sequential order.

Here, each multimedia announcement may contains a commercial advertisement or an information notice, and the display characteristics indicate one or more screen locations and display durations for each multimedia announcement to be displayed on the screen. Also, the processor may cooperates with the screen, the transceiver, and the memory to initially display a multimedia announcement at a screen location that was initially set and for a display duration that was initially set, to subsequently display the multimedia announcement at the same screen location or at one or more different screen locations, and/or to subsequently display the multimedia announcement for the same display duration or at one or more different display durations.

The present invention also may provide a processor controls a sequential display order for different types of multimedia announcements based on their priority settings. This priority setting may be determined by a user's interest and/or type of received announcement. For example, an emergency announcement has higher priority for displaying than a non-emergency announcement.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication terminal for providing contents to a user, comprising:
   a transceiver;
   a memory;
   a display unit; and
   a controller operatively connected to the transceiver, memory and the display unit, the controller configured to:
   periodically receive and buffer a set of default contents from a server,
   wherein each one of the set of default contents is configured with first pre-set options comprising an ID and a sequence number;
   sequentially display the set of default contents on the display unit based on the sequence number;
   receive a second content from the server,
   wherein the second content is configured with second pre-set options comprising an ID, a start time, and an end time;
   interrupt the display of the set of default contents and display the second content according to the start time and the end time; and
   upon completing the display of the second content, redisplay the set of default contents beginning at a position within the set of default contents where the display of the set of default contents was interrupted,
   wherein the controller is further configured to:
   receive a third content from the server,
   wherein the third content is configured with third pre-set options comprising an ID, a start time, and an end time;
   upon receipt of the third content, interrupt the display of the second content and display the third content based on the third pre-set options;
   upon completing the display of the third content, redisplay the second content beginning at a position within the second content where the display of the second content was interrupted; and
   register the mobile communication terminal with the server to indicate that the mobile communication terminal uses an update function.

2. The mobile communication terminal of claim 1, wherein the controller is configured to set or release the registration according to a user selection.

3. The mobile communication terminal of claim 1, wherein the controller is configured to cause the display unit to sequentially display the set of default contents and the second content in a horizontal direction or a vertical direction.

4. The mobile communication terminal of claim 1, wherein the controller is configured to cause the display unit to display the default content and the second content on at least one of an upper, a lower, or a side area of the display unit.

5. A contents provision system, comprising:
   a server; and
   a mobile communication terminal connected to the server via a network, the mobile communication terminal comprising:
   a transceiver;
   a memory;
   a display unit; and
   a controller operatively connected to the transceiver, memory and the display unit, the controller configured to:
   periodically receive and buffer a set of default contents from the server,
   wherein each one of the set of default contents is configured with first pre-set options comprising an ID and a sequence number;
   sequentially display the set of default contents on the display unit based on the sequence number;
   receive a second content from the server,
   wherein the second content is configured with second pre-set options comprising an ID, a start time, and an end time;
   interrupt the display of the set of default contents and display the second content according to the start time and the end time; and
   upon completing the display of the second content, redisplay the set of default contents beginning at a position within the set of default contents where the display of the set of default contents was interrupted,
   wherein the controller is configured to:
   receive a third content from the server,
   wherein the third content is configured with third pre-set options comprising an ID, a start time, and an end time;
   upon receipt of the third content, interrupt the display of the second content and display the third content based on the third pre-set options;
   upon completing the display of the third content, redisplay the second content beginning at a position within the second content where the display of the second content was interrupted to when the display of the third content concluded; and
   register the mobile communication terminal with the server to indicate that the mobile communication terminal uses an update function.

6. A method of communicating between a mobile communication terminal and a server, the method comprising:
   periodically receiving and buffering a set of default contents from a server,
   wherein each one of the set of default contents is configured with first pre-set options comprising an ID and a sequence number;

sequentially displaying the set of default contents on the display unit based on the sequence number;

receiving a second content from the server, wherein the second content is configured with second pre-set options comprising an ID, a start time, and an end time;

interrupting the display of the set of default contents and displaying the second content according to the start time and the end time; and upon completing the display of the second content, redisplaying the set of default contents beginning at a position within the set of default contents where the display of the set of default contents was interrupted, wherein the step of interrupting comprises:

receiving a third content from the server, wherein the third content is configured with third pre-set options comprising an ID, a start time, and an end time;

upon receipt of the third content, interrupting the display of the second content and displaying the third content based on the third pre-set options; and upon completing the display of the third content, redisplaying the second content beginning at a position within the second content where the display of the second content was interrupted; and registering the mobile communication terminal with the server to indicate that the mobile communication terminal uses an update function.

7. The method of claim 6, wherein the registration is set or released according to a user selection.

8. The method of claim 6, wherein the set of default contents and the second contents are sequentially displayed in a horizontal direction or a vertical direction.

9. The method of claim 6, wherein the set of default contents and the second contents are displayed on an upper, a lower, or a side area of a display.

* * * * *

UNITED STATES PATENT AND TRADEMARK OFFICE
CERTIFICATE OF CORRECTION

| | | |
|---|---|---|
| PATENT NO. | : 8,073,437 B2 | Page 1 of 1 |
| APPLICATION NO. | : 11/583701 | |
| DATED | : December 6, 2011 | |
| INVENTOR(S) | : Oh et al. | |

It is certified that error appears in the above-identified patent and that said Letters Patent is hereby corrected as shown below:

ON THE TITLE PAGE:

Insert the following as item (30):

-- (30)     Foreign Application Priority Data

Oct. 21, 2005     (KR) ................ 10-2005-0099885 --.

Signed and Sealed this
Twenty-first Day of February, 2012

David J. Kappos
*Director of the United States Patent and Trademark Office*